US008458070B2

(12) United States Patent
Rosko et al.

(10) Patent No.: US 8,458,070 B2
(45) Date of Patent: Jun. 4, 2013

(54) SYSTEM AND METHOD FOR PROVIDING CUSTOMERS WITH SEAMLESS ENTRY TO A REMOTE SERVER

(75) Inventors: Robert Rosko, West Chester, PA (US); Jayashree Gudipati, Devon, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/524,651

(22) Filed: Jun. 15, 2012

(65) Prior Publication Data

US 2012/0259777 A1    Oct. 11, 2012

Related U.S. Application Data

(63) Continuation of application No. 09/994,725, filed on Nov. 28, 2001, which is a continuation-in-part of application No. 09/591,687, filed on Jun. 12, 2000, now Pat. No. 7,426,530.

(51) Int. Cl.
*G06Q 40/00*    (2006.01)

(52) U.S. Cl.
USPC ............................................. 705/35; 705/67

(58) Field of Classification Search
USPC ..................................... 705/35, 67
See application file for complete search history.

(56) References Cited

U.S. PATENT DOCUMENTS

| 3,705,385 A | 12/1972 | Batz |
| 3,860,870 A | 1/1975 | Furuya |
| 3,896,266 A | 7/1975 | Waterbury |
| 3,938,091 A | 2/1976 | Liu |
| 4,013,962 A | 3/1977 | Beseke et al. |
| 4,321,672 A | 3/1982 | Thomson |
| 4,567,359 A | 1/1986 | Lockwood |
| 4,633,397 A | 12/1986 | Macco |
| 4,695,880 A | 9/1987 | Johnson |

(Continued)

FOREIGN PATENT DOCUMENTS

| CA | 2430549 | 6/2002 |
| DE | 197 31 293 | 1/1999 |

(Continued)

OTHER PUBLICATIONS

Aversion Therapy: Banks Overcoming Fear of the Net to Develop Safe Internet-based Payment System w/ Netscape Communicator, Network World, Dec. 12, 1994.

(Continued)

*Primary Examiner* — Ojo O Oyebisi
(74) *Attorney, Agent, or Firm* — Hunton & Williams LLP

(57) ABSTRACT

The present invention provides a seamless entry system that comprises a universal session manager. Users connect to the host service provider with a unique username and password. Then, through a series of data exchanges between the universal session manager, a validation database, and the remote service module, the customer may be transparently logged into remote service providers. Internet banking customers utilize a browser system to connect to a host server providing a range of banking services supported by a remote or distinct server. According to the method, the customer first enters a username and password to gain access to the host service provider. The universal session manager transmits data required for login to the remote service provider. The user is thus able to utilize the remote services with his/her web browser system without having entered a username or password particular to the remote service.

20 Claims, 6 Drawing Sheets

U.S. PATENT DOCUMENTS

| | | |
|---|---|---|
| 4,696,491 A | 9/1987 | Stenger |
| 4,713,761 A | 12/1987 | Sharpe |
| 4,725,719 A | 2/1988 | Roach |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,424,938 A | 6/1995 | Wagner |
| 5,425,102 A | 6/1995 | Moy |
| 5,446,740 A | 8/1995 | Yien |
| 5,450,134 A | 9/1995 | Legate |
| 5,450,537 A | 9/1995 | Hirai |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Naylor |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,437 A | 7/1996 | Kaku |
| 5,544,086 A | 8/1996 | Davis |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton |
| 5,625,767 A | 4/1997 | Bartell |
| 5,634,101 A | 5/1997 | Blau |
| 5,638,457 A | 6/1997 | Deaton |
| 5,640,577 A | 6/1997 | Scharmer |
| 5,642,419 A | 6/1997 | Rosen |
| 5,644,493 A | 7/1997 | Motai |
| 5,652,786 A | 7/1997 | Rogers |
| 5,653,914 A | 8/1997 | Gruener |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,684,950 A | 11/1997 | Dare et al. |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose et al. |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn |
| 5,742,683 A | 4/1998 | Lee et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug |
| 5,793,861 A | 8/1998 | Haigh |
| 5,794,178 A | 8/1998 | Caid et al. |
| 5,794,207 A | 8/1998 | Walker et al. |
| 5,794,221 A | 8/1998 | Egendorf |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams |
| 5,815,665 A | 9/1998 | Teper et al. |
| 5,815,683 A | 9/1998 | Vogler |
| 5,818,936 A | 10/1998 | Mashayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |

| Patent | Date | Inventor |
|---|---|---|
| 5,828,812 A | 10/1998 | Khan et al. |
| 5,828,833 A | 10/1998 | Belville et al. |
| 5,832,211 A | 11/1998 | Blakely, III et al. |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West |
| 5,845,260 A | 12/1998 | Nakano |
| 5,847,709 A | 12/1998 | Card |
| 5,848,143 A | 12/1998 | Andrews |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakely, III et al. |
| 5,864,830 A | 1/1999 | Armetta et al. |
| RE36,116 E | 2/1999 | McCarthy |
| 5,866,889 A | 2/1999 | Weiss et al. |
| 5,870,456 A | 2/1999 | Rogers |
| 5,870,718 A | 2/1999 | Spector |
| 5,870,724 A | 2/1999 | Lawlor |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,883,810 A | 3/1999 | Franklin et al. |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,889,863 A | 3/1999 | Weber |
| 5,892,900 A | 4/1999 | Ginter |
| 5,898,780 A | 4/1999 | Liu |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare |
| 5,915,244 A | 6/1999 | Jack |
| 5,918,214 A | 6/1999 | Perkowski |
| 5,918,217 A | 6/1999 | Maggioncalda |
| 5,918,239 A | 6/1999 | Allen |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah et al. |
| 5,933,817 A | 8/1999 | Hucal |
| 5,933,823 A | 8/1999 | Cullen |
| 5,933,827 A | 8/1999 | Cole et al. |
| 5,940,812 A | 8/1999 | Tengel |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki et al. |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee |
| 5,960,411 A | 9/1999 | Hartman |
| 5,961,593 A | 10/1999 | Gabber et al. |
| 5,963,635 A | 10/1999 | Szlam et al. |
| 5,963,915 A | 10/1999 | Kirsch |
| 5,963,925 A | 10/1999 | Kolling et al. |
| 5,963,952 A | 10/1999 | Smith |
| 5,963,953 A | 10/1999 | Cram |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthum |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,982,370 A | 11/1999 | Kamper |
| 5,983,196 A | 11/1999 | Wendkos |
| 5,987,434 A | 11/1999 | Libman |
| 5,987,454 A * | 11/1999 | Hobbs ............... 1/1 |
| 5,987,498 A | 11/1999 | Athing et al. |
| 5,987,611 A | 11/1999 | Freund |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette |
| 5,991,780 A | 11/1999 | Rivette |
| 5,991,882 A | 11/1999 | O'Connell |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelley et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen |
| 6,018,718 A | 1/2000 | Walker et al. |
| 6,023,698 A | 2/2000 | Lavey et al. |
| 6,024,640 A | 2/2000 | Walker et al. |
| 6,026,398 A | 2/2000 | Brown et al. |
| 6,026,429 A | 2/2000 | Jones |
| 6,026,491 A | 2/2000 | Hiles |
| 6,032,134 A | 2/2000 | Weissman |
| 6,032,147 A | 2/2000 | Williams |
| 6,038,547 A | 3/2000 | Casto |
| 6,038,552 A | 3/2000 | Fleischl et al. |
| 6,041,357 A | 3/2000 | Kunzelman et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker |
| 6,065,120 A | 5/2000 | Laursen et al. |
| 6,065,675 A | 5/2000 | Teicher |
| 6,070,147 A | 5/2000 | Harms et al. |
| 6,070,153 A | 5/2000 | Simpson |
| 6,070,244 A | 5/2000 | Orchier et al. |

| | | | | | | |
|---|---|---|---|---|---|---|
| 6,073,105 | A | 6/2000 | Sutcliffe et al. | 6,253,328 B1 | 6/2001 | Smith, Jr. |
| 6,073,113 | A | 6/2000 | Guinan | 6,256,664 B1 | 7/2001 | Donoho et al. |
| 6,075,519 | A | 6/2000 | Okatani et al. | 6,260,026 B1 | 7/2001 | Tomida et al. |
| 6,076,072 | A | 6/2000 | Libman | 6,266,648 B1 | 7/2001 | Baker, III |
| 6,081,790 | A | 6/2000 | Rosen | 6,266,683 B1 | 7/2001 | Yehuda et al. |
| 6,081,810 | A | 6/2000 | Rosenzweig | 6,267,292 B1 | 7/2001 | Walker et al. |
| 6,081,900 | A | 6/2000 | Subramaniam et al. | 6,269,348 B1 | 7/2001 | Pare et al. |
| 6,085,168 | A | 7/2000 | Mori et al. | 6,275,944 B1 | 8/2001 | Kao et al. |
| 6,088,444 | A | 7/2000 | Walker et al. | 6,289,322 B1 | 9/2001 | Kitchen et al. |
| 6,088,451 | A | 7/2000 | He et al. | 6,298,330 B1 | 10/2001 | Gardenswartz et al. |
| 6,088,683 | A | 7/2000 | Jalili | 6,298,356 B1 | 10/2001 | Jawahar et al. |
| 6,088,686 | A | 7/2000 | Walker et al. | 6,298,383 B1 | 10/2001 | Gutman et al. |
| 6,088,700 | A | 7/2000 | Larsen | 6,301,567 B1 | 10/2001 | Leong et al. |
| 6,091,817 | A | 7/2000 | Bertina et al. | 6,308,273 B1 | 10/2001 | Goertzel et al. |
| 6,092,192 | A | 7/2000 | Kanevsky et al. | 6,308,274 B1 | 10/2001 | Swift |
| 6,092,196 | A | 7/2000 | Reiche | 6,311,275 B1 | 10/2001 | Jin et al. |
| 6,095,412 | A | 8/2000 | Bertina et al. | 6,317,834 B1 | 11/2001 | Gennaro et al. |
| 6,098,070 | A | 8/2000 | Maxwell | 6,317,838 B1 | 11/2001 | Baize |
| 6,101,486 | A | 8/2000 | Roberts et al. | 6,324,524 B1 | 11/2001 | Lent et al. |
| 6,104,716 | A | 8/2000 | Crichton et al. | 6,327,573 B1 | 12/2001 | Walker et al. |
| 6,105,012 | A | 8/2000 | Chang et al. | 6,327,578 B1 | 12/2001 | Linehan |
| 6,105,865 | A | 8/2000 | Hardesty | 6,332,192 B1 | 12/2001 | Boroditisky et al. |
| 6,111,858 | A | 8/2000 | Greaves et al. | 6,336,104 B1 | 1/2002 | Walker et al. |
| 6,112,181 | A | 8/2000 | Shear | 6,339,423 B1 | 1/2002 | Sampson |
| 6,112,185 | A | 8/2000 | Walker et al. | 6,343,279 B1 | 1/2002 | Bissonette et al. |
| 6,115,690 | A | 9/2000 | Wong | 6,343,323 B1 | 1/2002 | Kalpio |
| 6,119,093 | A | 9/2000 | Walker et al. | 6,345,261 B1 | 2/2002 | Feidelson |
| 6,119,099 | A | 9/2000 | Walker et al. | 6,349,242 B2 | 2/2002 | Mahaffey |
| 6,128,599 | A | 10/2000 | Walker et al. | 6,349,336 B1 | 2/2002 | Sit et al. |
| 6,128,602 | A | 10/2000 | Northington et al. | 6,356,905 B1 | 3/2002 | Gershman et al. |
| 6,131,810 | A | 10/2000 | Weiss | 6,363,381 B1 | 3/2002 | Lee et al. |
| 6,134,549 | A | 10/2000 | Regnier | 6,385,591 B1 | 5/2002 | Mankoff |
| 6,134,592 | A | 10/2000 | Montulli | 6,385,652 B1 | 5/2002 | Brown et al. |
| 6,135,349 | A | 10/2000 | Zirkel | 6,401,125 B1 | 6/2002 | Makarios et al. |
| 6,138,106 | A | 10/2000 | Walker et al. | 6,401,211 B1 | 6/2002 | Brezak, Jr. et al. |
| 6,138,118 | A | 10/2000 | Koppstein et al. | 6,408,389 B2 | 6/2002 | Grawrock et al. |
| 6,141,651 | A | 10/2000 | Riley et al. | 6,411,933 B1 | 6/2002 | Maes et al. |
| 6,141,666 | A | 10/2000 | Tobin | 6,418,457 B1 | 7/2002 | Schmidt et al. |
| 6,144,946 | A | 11/2000 | Iwamura | 6,438,594 B1 | 8/2002 | Bowman-Amuah |
| 6,144,948 | A | 11/2000 | Walker | 6,438,666 B2 | 8/2002 | Cassagnol et al. |
| 6,145,086 | A | 11/2000 | Bellemore et al. | 6,449,765 B1 | 9/2002 | Ballard |
| 6,148,293 | A | 11/2000 | King | 6,453,353 B1 | 9/2002 | Win et al. |
| 6,151,584 | A | 11/2000 | Papierniak et al. | 6,460,141 B1 | 10/2002 | Olden |
| 6,154,750 | A | 11/2000 | Roberge et al. | 6,487,641 B1 | 11/2002 | Cusson et al. |
| 6,154,879 | A | 11/2000 | Pare et al. | 6,490,601 B1 | 12/2002 | Markus et al. |
| 6,161,139 | A | 12/2000 | Win et al. | 6,493,677 B1 | 12/2002 | von Rosen et al. |
| 6,161,182 | A | 12/2000 | Nadooshan | 6,493,685 B1 | 12/2002 | Ensel et al. |
| 6,164,533 | A | 12/2000 | Barton | 6,496,855 B1 | 12/2002 | Hunt et al. |
| 6,170,011 | B1 | 1/2001 | Macleod Beck | 6,496,936 B1 | 12/2002 | French et al. |
| 6,178,511 | B1 | 1/2001 | Cohen et al. | 6,505,238 B1 | 1/2003 | Tran |
| 6,182,052 | B1 | 1/2001 | Fulton et al. | 6,507,912 B1 | 1/2003 | Matyas, Jr. et al. |
| 6,182,142 | B1 | 1/2001 | Win et al. | 6,510,523 B1 | 1/2003 | Perlman et al. |
| 6,182,220 | B1 | 1/2001 | Chen et al. | 6,526,404 B1 | 2/2003 | Slater et al. |
| 6,182,225 | B1 | 1/2001 | Hagiuda et al. | 6,532,284 B2 | 3/2003 | Walker et al. |
| 6,185,242 | B1 | 2/2001 | Arthur | 6,535,855 B1 | 3/2003 | Cahill et al. |
| 6,185,689 | B1 | 2/2001 | Todd et al. | 6,535,917 B1 | 3/2003 | Zamanzadeh et al. |
| 6,189,029 | B1 | 2/2001 | Fuerst | 6,535,980 B1 | 3/2003 | Kumar et al. |
| 6,195,644 | B1 | 2/2001 | Bowie | 6,539,424 B1 | 3/2003 | Dutta |
| 6,199,077 | B1 | 3/2001 | Inala et al. | 6,557,039 B1 | 4/2003 | Leong et al. |
| 6,201,948 | B1 | 3/2001 | Cook et al. | 6,574,348 B1 | 6/2003 | Venkatesan et al. |
| 6,202,005 | B1 | 3/2001 | Mahaffey | 6,580,814 B1 | 6/2003 | Ittycheriah et al. |
| 6,202,054 | B1 | 3/2001 | Lawlor et al. | 6,581,040 B1 | 6/2003 | Wright et al. |
| 6,202,066 | B1 | 3/2001 | Barkley et al. | 6,584,505 B1 | 6/2003 | Howard et al. |
| 6,202,151 | B1 | 3/2001 | Musgrave et al. | 6,584,508 B1 | 6/2003 | Epstein et al. |
| 6,202,158 | B1 | 3/2001 | Urano et al. | 6,589,291 B1 | 7/2003 | Boag et al. |
| 6,208,978 | B1 | 3/2001 | Walker et al. | 6,592,044 B1 | 7/2003 | Wong et al. |
| 6,208,984 | B1 | 3/2001 | Rosenthal | 6,606,606 B2 | 8/2003 | Starr |
| 6,216,115 | B1 | 4/2001 | Barrameda et al. | 6,609,106 B1 | 8/2003 | Robertson |
| 6,219,639 | B1 | 4/2001 | Bakis et al. | 6,609,113 B1 | 8/2003 | O'Leary et al. |
| 6,219,706 | B1 | 4/2001 | Fan | 6,609,125 B1 | 8/2003 | Layne et al. |
| 6,222,914 | B1 | 4/2001 | McMullin | 6,609,198 B1 | 8/2003 | Wood et al. |
| 6,226,623 | B1 | 5/2001 | Schein et al. | 6,609,654 B1 | 8/2003 | Anderson et al. |
| 6,226,679 | B1 | 5/2001 | Gupta | 6,611,498 B1 | 8/2003 | Baker et al. |
| 6,226,752 | B1 | 5/2001 | Gupta et al. | 6,618,579 B1 | 9/2003 | Smith et al. |
| 6,227,447 | B1 | 5/2001 | Campisano | 6,618,806 B1 | 9/2003 | Brown et al. |
| 6,230,148 | B1 | 5/2001 | Pare et al. | 6,623,415 B2 | 9/2003 | Gates et al. |
| 6,243,688 | B1 | 6/2001 | Kalina | 6,640,302 B1 | 10/2003 | Subramaniam et al. |
| 6,243,816 | B1 | 6/2001 | Fang et al. | 6,668,322 B1 | 12/2003 | Wood et al. |
| 6,253,327 | B1 | 6/2001 | Zhang et al. | 6,671,818 B1 | 12/2003 | Mikurak |

| | | |
|---|---|---|
| 6,675,261 B2 | 1/2004 | Shandony |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,691,232 B1 | 2/2004 | Wood et al. |
| 6,697,947 B1 | 2/2004 | Matyas, Jr. et al. |
| 6,711,610 B1 | 3/2004 | Harris |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,763,468 B2 | 7/2004 | Gupta et al. |
| 6,766,370 B2 | 7/2004 | Glommen et al. |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1 | 11/2004 | Chawla et al. |
| 6,832,202 B1 | 12/2004 | Schuyler et al. |
| 6,847,991 B1 | 1/2005 | Kurapati |
| 6,856,970 B1 | 2/2005 | Campbell et al. |
| 6,892,231 B2 | 5/2005 | Jager |
| 6,907,566 B1 | 6/2005 | McElfresh et al. |
| 6,925,481 B2 | 8/2005 | Singhal et al. |
| 6,934,848 B1 | 8/2005 | King et al. |
| 6,938,158 B2 | 8/2005 | Azuma |
| 6,950,936 B2 | 9/2005 | Subramaniam et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,010,512 B1 | 3/2006 | Gillin et al. |
| 7,020,696 B1 | 3/2006 | Perry et al. |
| 7,023,862 B2 | 4/2006 | Saito et al. |
| 7,032,110 B1 | 4/2006 | Su et al. |
| 7,058,817 B1 | 6/2006 | Ellmore |
| 7,080,036 B1 | 7/2006 | Drummond et al. |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,117,239 B1 | 10/2006 | Hansen |
| 7,124,101 B1 | 10/2006 | Mikurak |
| 7,137,006 B1 * | 11/2006 | Grandcolas et al. .......... 713/180 |
| 7,188,181 B1 | 3/2007 | Squier et al. |
| 7,225,249 B1 | 5/2007 | Barry et al. |
| 7,343,495 B2 | 3/2008 | Kambayashi et al. |
| 2001/0011255 A1 | 8/2001 | Asay et al. |
| 2001/0012974 A1 | 8/2001 | Mahaffey |
| 2001/0027474 A1 | 10/2001 | Nachman et al. |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1 | 3/2002 | McCarty et al. |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0069172 A1 | 6/2002 | Omshehe et al. |
| 2002/0077978 A1 | 6/2002 | O'Leary et al. |
| 2002/0087447 A1 | 7/2002 | McDonald et al. |
| 2002/0095443 A1 | 7/2002 | Kovack |
| 2002/0099826 A1 | 7/2002 | Summers et al. |
| 2002/0099936 A1 | 7/2002 | Kou |
| 2002/0104006 A1 | 8/2002 | Boate et al. |
| 2002/0104017 A1 | 8/2002 | Stefan |
| 2002/0107788 A1 | 8/2002 | Cunningham |
| 2002/0152163 A1 | 10/2002 | Bezos et al. |
| 2002/0165949 A1 | 11/2002 | Na |
| 2002/0174010 A1 | 11/2002 | Rice, III |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edwards et al. |
| 2003/0026404 A1 | 2/2003 | Joyce et al. |
| 2003/0034388 A1 | 2/2003 | Routhenstein et al. |
| 2003/0037131 A1 | 2/2003 | Verma |
| 2003/0037142 A1 | 2/2003 | Munger et al. |
| 2003/0040995 A1 | 2/2003 | Daddario et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0101116 A1 | 5/2003 | Rosko et al. |
| 2003/0105981 A1 | 6/2003 | Miller et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0154403 A1 | 8/2003 | Keinsley et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0177067 A1 | 9/2003 | Cowell et al. |
| 2003/0191549 A1 | 10/2003 | Otsuka et al. |
| 2004/0031856 A1 | 2/2004 | Atsmon et al. |
| 2004/0049702 A1 | 3/2004 | Subramaniam et al. |
| 2004/0117409 A1 | 6/2004 | Scahill et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0120180 A1 | 6/2005 | Schombach et al. |
| 2005/0278641 A1 | 12/2005 | Mansour et al. |

FOREIGN PATENT DOCUMENTS

| | | |
|---|---|---|
| EP | 855659 | 7/1998 |
| EP | 0 884 877 | 12/1998 |
| EP | 0 917 119 | 5/1999 |
| EP | 1014318 A2 | 6/2000 |
| EP | 1 022 664 | 7/2000 |
| EP | 1056043 | 11/2000 |
| EP | 1089516 | 4/2001 |
| JP | H10-187467 | 7/1998 |
| JP | 200324329 | 11/2000 |
| JP | 2001134672 | 5/2001 |
| JP | 2005-242976 | 9/2005 |
| WO | WO 97/43736 | 11/1997 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |
| WO | WO 2004/079603 | 9/2004 |

OTHER PUBLICATIONS

Anonymous, Corba Overview, arch2.htm at pent21.infosys.tuwien. ac.at, May 25, 1999.
Anonymous, Overview of CORBA, May 25, 1999.

Applets, java.sun.com, May 21, 1999.

Associates National Bank (DE) Credit Card Services, The Associates, www.theassocitheassociates.atescomcorn/consumer/credit_cards/main.html, Apr. 6, 1999.

At Your Request, Wingspanbankcom, Sep. 28, 1999.

Bechtel Construction Operations Incorporated Standardizes on Primavera's Expedition Contract Management Software, Business Wire, Jul. 27, 1999.

Berry et al., A potent new tool for selling databse, Business Week, Cover Story, Sep. 5, 1994, pp. 56-62.

Carden, Philip, The New Face of Single Sign-on, Network Computing, http://www.networkcomputing.com, printed Dec. 29, 2000, 4 pages.

Chester, Cross-platform integration with XML and SOAP, IT PTO Sep.-Oct. 2001.

Civitello Jr., Construction Operations Manual of Policies and Procedures, Third Edition, 2000.

Consortium Created to Manage Common Electronic Purse Specifications, http://www.visa.com/av/news/PRmisc051199.vhtml, printed Feb. 23, 2001.

Construction Financing to Build Your Own Home, ISBN: 0962864307, Jul. 1990.

Cotts, David, The Facility Management Handbook Second Edition AMACM, 1998, ISBN: 0-8144-030-8.

David Bank, Cash, Check, Charge—What's Next?, Seattle Times, Apr. 6, 1998.

Deckmyn, Dominique, San Francisco manages $45M project via web-based Service, Computerworld, Aug. 9, 1999, vol. 33, No. 32, p. 14.

Don Clark, Microsoft, Visa to Jointly Develop PC Electronic-Shopping Software, Wall Street Journal, The, B9, Nov. 9, 1994.

eCharge, eCharge Corporation, www.echarge.com, Dec. 3, 1999.

Frank, John N. Frank, Beyond Direct Mail, Credit Card Management, vol. 9, Iss. 5, Aug. 1996, 4pgs.

FreeMarkets, FreeMarkets Online, Inc., Apr. 26, 1999.

Friedman, Dictionary of Business Terms, Barron's Third Edition, Copyright 2000.

Fujimura et al., XML Voucher: Generic Voucher Language, Feb. 2003.

Fusaro, Roberta, Builders Moving to Web tools Computerworld, Nov. 16, 1998, vol. 32, No. 46, pp. 51, 53.

Gerry Vandenengel, Cardson the Internet: Advertising on a $3 Bill, Industry Intelligence, Feb. 1, 1995.

Getting Started: Specific GE TPN Post Service Use Guidelines, GE, Apr. 26, 1999.

Harris InfoSource, Apr. 26, 1999.

Harris, Planning Using Primavera Project Planner P3 Version 3.0, User Guide, Copyright 1999 by Eastwood Harry Pty Ltd., 1999.

Hernandez, Tomas et al., Software Solutions Building Design & Construction, Nov. 1999, vol. 40, No. 11, pp. 38-40.

Jakobsson et al., Secure and lightweight advertising on the web, Computer Networks, 31 (1999) 1101-1109.

JAVA, Banking on JAVA™ Technology, java.sun.com, May 21, 1999.

JAVA, JAVA™ Remote Method Invocation (RMI) Interface, java.sun.com, May 21, 1999.

JAVA, JAVA™ Technology in the Real World, java.sun.com, May 21, 1999.

JAVA, JAVA™ Servlet API, java.sun.com, May 21, 1999.

JAVA, Staying in Touch with JNDI, java.sun.com, May 21, 1999.

JAVA, The JDBC™ Data Access API, java.sun.com, May 21, 1999.

Jeffrey Kutler, A Different Drummer on the Data Highway, American Banker, May 12, 1995.

Jeffrey Kutler, Cash Card Creator Looking Beyond Mondex, Feb. 9, 1995.

Jepsen, SOAP Cleans up interoperability problems on the web, IT PTO, Jan./Feb. 2001.

Johnston, Pondering Passport: Do You Trust Microsoft With Your Data?, www.pcworld.com/resource/printable/article/0.aid,63244,00.asp, Sep. 24, 2001.

Kennedy Maiz, Fannie Mae on the Web, Newsbyte, May 8, 1995.

Kim A. Strassel, Dutch Software Concern Experiments with Electronic 'Cash' in Cyberspace, Wall Street Journal, Apr. 17, 1995.

Knowles, Anne Improved Internet Security Enabling On-Line Commerce, PC Week, Mar. 20, 1995.

Kormann, Risks of the Passport Single Signon Protocol, Computer Networks, Elsevier Science Press, vol. 33, Sep. 20, 2003, pp. 51-58.

Kutler, A Different Drummer on the Data Highway, American Banker, Section: No. 91, vol. 160, May 12, 1995, p. 14.

Larsen, Amy, Internet goes to Work for Builders, InterWeek, Nov. 16, 1998, Issue 741.

Marchman, Construction Scheduling with Primavera Project Planner, May 25, 1999.

Marlin, Chasing Document Management, Inform, vol. 13, No. 4, Apr. 199, p. 76-82.

Marvin Sirbu and J.D. Tygar, NetBill: An Internet Commerce System Optimized for Network Delivered Services, http://www.ini.cmu.edu:80/netbill, pp. 1-12, Feb. 27, 1995.

Mary C. Lacity, et al., Mary C. Lacity, et al., The Information Systems Outsourcing Bandwagon, Sloan Management Review, vol. 35, No. 1, Fall 1993, p. 73-86.

Method of Protecting Data on a Personal Computer, IBM Corporation, TDB 11-85, Order 85A 62426, Nov. 1, 1995, p. 2530.

Mitchell, Cyberspace: Crafting Software . . . , Business Week, Feb. 27, 1999, pp. 78-86.

Robyn Meredith, Internet bank moves closer to virtual reality, USA Today, May 5, 1995.

Richard Mitchell, Netlink Goes After an Unbanked Niche, wysiwyg://0/http://www.dialogclassic.com/history, ISSN: 1093-1279, Sep. 1999.

Mosig, Richard, Software Review: the Construction Project Manager Cost Engineering, Jan. 1996, vol. 38, No. 1, pp. 7-8.

OMG, Library, www.omg.com, May 25, 1999.

OMG, Welcome to OMG's CORBA for Beginners Page!, www.omg.com, May 25, 1999.

OMG, What is CORBA?, , www.omg.com, May 25, 1999.

OMWARE, Inc., Web Pages, Feb. 2000, Retrieved from http://web.archive.org/web20000226033405/www.omware.com/products.html, Retrieved from the interneet on Nov. 28, 2005.

Overview of CORBA, www.omg.com, May 25, 1999.

Owens, David, Facilities Planning & Relocation RSMeans, 1993, ISBN: 0-87629-281-3.

Point for Windows Version 3.x Interface Marketing Guide.pdf.

Post, E-Cash: Can't Live With It, Can't Live Without It, The American Lawyer, Mar. 1, 1995, pp. 116-117.

Primavera and PurchasePro.com to Create E-Commerce Marketplace for Construction Industry, Primavera Ships P3, version 3.0, www.purchasepro.com/, Sep. 21, 1999, pp. 1-3.

Primavera Systems Delivers Expedition Express,Business Wire, Feb. 23, 1999.

Primavera Systems, Inc.—How the World Manages Projects, Expedition Contract Control Software, www.primavera.com, Jun. 23, 2005.

Product Data Integration Technologies, Inc., PDIT, Apr. 26, 1999.

Radosevich, Is Work Flow Working?, CNN.com, Apr. 6, 1999 at <http://www.cnn.com/TECH/computing/9904/06/workflow/ent.idg, p. 1 of 5, retrieved from the Internet on Nov. 28, 2005.

Resource Center: Consolidated Edison Selects GE TPN Post, GE, Apr. 26, 1999.

Reuters, Getting Smart with Java: Sun Micro Says American Express to Use Java for Smart Card, www.abcnew.go.com/sciences/tech, Jun. 6, 2000.

Ritz, Total Construction Project Management, McGraw-Hill, 1994.

Robert Barnham, Network Brings Together Producers and Companies, Bests Review.

S. R. Hiremath, Numerical Credit Scoring Model, Operations Research Bulletin, WA13.16, Apr. 30, 1975.

Safe Single-Sign-On Protocol with Minimal Password Exposure No Decryption and Technology Adaptivity, IBM Corporation, TDB 03-95, Order 95A, Mar. 1, 1995, pp. 245-248.

SBA: Pro-Net, SBA, Apr. 1, 1999.

Seibert, Paul, Facilities Planning & Design for Financial Institutions Bankline Publications, 1996, ISBN: 1-55738-780-X.

Servlet/Applet/HTML Authentication Process with Single Sign-On, IBM Corporation, IBM Order: 00A6004, Jan. 1, 2000.

Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
SoluSource: For Engineers by Engineers, Thomas Publishing Company, Apr. 26, 1999.
Stephen Eppmt, A pLayer Goes After Big Bucks in Cyberspace, American Banker, May 5, 1995.
Summary of the at Your Request Architecture, First USA Bank Confidential and Proprietary, Apr. 2, 1999, pp. 1-8.
Sun Microsystems, Inc., Schema for Representing CORBA Objects in an LDAP directory, May 21, 1999, pp. 1-9.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, 03-93, Order 93A 60636, Mar. 1, 1993, pp. 451-454.
The check is in the email., Information Today, vol. 12, No. 3, Mar. 1, 1995, ISSN: 8755-6286.
The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p. 4241047.
Thomas Publishing Company, ThomasNet, Apr. 26, 1999.
Thomas, Anne Enterprise JAVABEANS™ Technology: Server Component Model for the Javan™ platform, java.sun.com, May 21, 1999.
ThomasNet, Thomas Publishing Company, Apr. 26, 1999.
Tracy Pletz at al., Summary of the at your risk architecture, Jun. 3, 1999.
Understanding Product Data Management, Hewlett-Packard Company, Apr. 26, 1999.
Vanessa Houlder, OFT Gives the Individual Top Priority: Report Calls for Deregulation of Business Lending, The Financial Times, Jun. 8, 1994.
Welcome to MUSE, MUSE Technologies, Apr. 26, 1999.

* cited by examiner

Log In

Username: ☐
Password: ☐  Note: Passwords are case sensitive

[Log In]  [Reset]

Did you forget your username or password? Do you need a new
username and password?
For seamless access to your accounts, create a new
username and password using the same information
(Social Security number, mother's maiden name,
and birth date) that you used when you first registered.

Are you having trouble signing in?
If you're sure you're using the correct username and
password, but you sitll
can't log in, call
888-736-8611

Are you new?
Learn more about who we are and our products and
services.

Attempts at unauthorized access, actual unauthorized
access or use of this site is not permitted and constitutes
a crime punishable by law (18 USC 1030). Individuals
who attempt unauthorized transactions will be subject to
criminal and/or civil prosecution. We reserve the right to
view, monitor, and record activity on the system without
notice or permission. Any information obtained by
WingspanBank.com is subject to review by law
enforcement organizations in connection with the
investigation or prosecution of possible criminal activity
on the system. If you are not an authorized user of this
system or do not consent to continued monitoring,
please exit the system at this time.

FIG. 3A

SELECT USERNAME AND PASSWORD

To begin the selection process, please enter the information requested below, then click on the *Submit* button SSN or Tax ID: [       ]   999-99-9999 or 999999999

Mother's Maiden Name: [       ]

Date of Birth: [       ]   MM/DD/YYYY or MMDDYYYY

By submitting this request, I understand and agree I am bound by the terms and conditions that govern my Accounts

[Submit]   [Reset]

Please call 1-888-736-8611 to receive additional copies of the terms and conditions specific to your account.

FDK

FIG. 3B

SYSTEM AND METHOD FOR PROVIDING CUSTOMERS WITH SEAMLESS ENTRY TO A REMOTE SERVER

CROSS REFERENCE TO RELATED APPLICATIONS

This application is a continuation of application Ser. No. 09/994,725 filed on Nov. 28, 2001, entitled "System and Method for Providing Customers with Seamless Entry to a Remote Server", which is a continuation in part of application Ser. No. 09/591,687 filed on Jun. 12, 2000 now U.S. Pat. No. 7,426,530, entitled "System and Method for Providing Customers with Seamless Entry to a Remote Server", and both of which are incorporated herein by reference in their entirety for all purposes, and both to which priority is claimed.

FIELD OF THE INVENTION

The present invention relates to a method that provides customers of a host service provider or host server with a seamless experience, allowing them to access remote network services, which typically require their own username, password, and session management application, via a single login to the host service provider.

BACKGROUND OF THE INVENTION

A network service provider may want to provide its customers with access to services that are not provided directly by its server. Therefore, the service provider may have to redirect its customers to another remote server capable of providing the service.

For example, an Internet banking site may wish to provide its customers with a full range of banking services, e.g., opening and maintaining a checking account, applying for a credit card or loan, paying bills, or accessing brokerage or financial planning services. Each of these Internet banking services may be provided by an independent server that requires the user to enter a unique username (or ID) and password. Therefore, when a customer wishes to utilize a banking service that is provided by a remote server, after the Internet banking host server redirects the customer to the remote service provider, the customer must enter a new username and password specific to that service. Given the broad range of services that an Internet bank may wish to provide, this places the burden of remembering and entering multiple usernames and passwords on the customer. This is a significant drawback to the customer. This is also a significant drawback to the Internet bank because customer dissatisfaction may result in lost accounts.

Furthermore, if the customer returns to the host provider after accessing a remote service provider, and then desires to return to the remote service provider, the customer must re-enter the same username and password for that service. For example, in the Internet banking context, if a customer decides to access his or her checking account, then utilize brokerage services, and then desires to return to his or her checking account, the customer must enter his or her unique username and password for the checking account service twice. This is a significant drawback.

In addition, a host service provider may wish to change the remote service providers that customers can access through its server. In the Internet banking context, for example, a host Internet bank may utilize a particular remote service to provide its customers with checking account services. For different reasons, the host Internet bank may later wish to change the remote checking account service provider. This would require the Internet banking customer to create and remember a new username and password for the new remote service. Again, the burden of remembering an even greater number of user names and passwords falls on the customer and the risk of losing those customers is borne by the host Internet bank. This is another significant drawback.

Other drawbacks to conventional approaches exist.

SUMMARY OF THE INVENTION

The present invention overcoming these and other drawbacks of existing systems relates to a system and method for providing customers with seamless entry to a remote server, in which a mediation engine coordinates access to multiple network sites without a need for continuous reentry of user ID or other information.

One feature of the present invention is to provide a specific time limit which a user can spend logged into the system.

Another feature of the present invention is to monitor the state of a user to determine whether the user is logged in or not.

Another feature of the present invention is to provide customers of a host service provider with a seamless experience enabling them to gain access to one or more remote services by entering a single username and password required by the host service provider.

Another feature of the invention is to enable customers of a host service provider to regain access to a remote service provider, after having exited that remote server, without having to re-enter the username and password required by that remote service provider.

Another feature of the invention is to enable a host service provider to replace or add remote services that a customer can access through the host service provider without placing the additional burden on customers to enter a new username and password.

Another feature of the present invention is to provide an on-line banking service having a consolidated financial homepage that gives customers a read-only summary of information on all accounts they currently have with the banking service as well as value-add features like stock portfolio, personal reminders and targeted news feeds.

Another feature of the present invention may include the capability to personalize the web site based on customer information and preferences.

Yet another feature of the present invention may include the ability for customers to bookmark pages inside of the on-line bank, and access those pages directly without accessing a homepage.

These and other features of the invention will become apparent to persons skilled in this art from the following description.

One aspect of the present invention provides a seamless entry banking system for offering a plurality of financial products and services to customers via a single login. The banking system comprises a host server, at least one remote server, a universal session manager, and a validation module operatively linked through an electronic network. The universal session manager and validation module enable customers of the banking system to access the host server and a remote server via a single login either to the host server or a remote server. For example customers (or users) may connect to a host service provider module using a unique username and password. Then, through a series of data exchanges, or handshakes, between the universal session manager, the validation module database, and a remote server, the customer may be transparently logged into the remote server or service provider. The universal session manager and/or the validation database may be a part of the host server service module or alternatively may be operated independently of the host server.

Customers may utilize a browser system to connect to the banking system. The banking system may provide a range of banking services including on-line bill paying, instant credit card applications, loan applications, online automated clearinghouse (ACH), or checking account services. Each service may be supported by the host server or a remote or distinct server that is operatively linked to the host server.

Another aspect of the present invention relates to a method for accessing a plurality of financial services and products that are offered by a banking system comprising a host server and a plurality of remote servers operatively linked across an electronic network. The method includes receiving login information for accessing the host server from a customer of the banking system and retrieving data for accessing at least one remote server based at least in part on the received login information. The method further includes transmitting the retrieved data to the at least one remote server thus allowing the customer to transparently gain access to the remote server.

BRIEF DESCRIPTION OF THE DRAWINGS

FIGS. 3A and 3B depict an exemplary graphical user interface, according to an embodiment of the present invention.

DETAILED DESCRIPTION OF PREFERRED EMBODIMENTS

Figure 1:
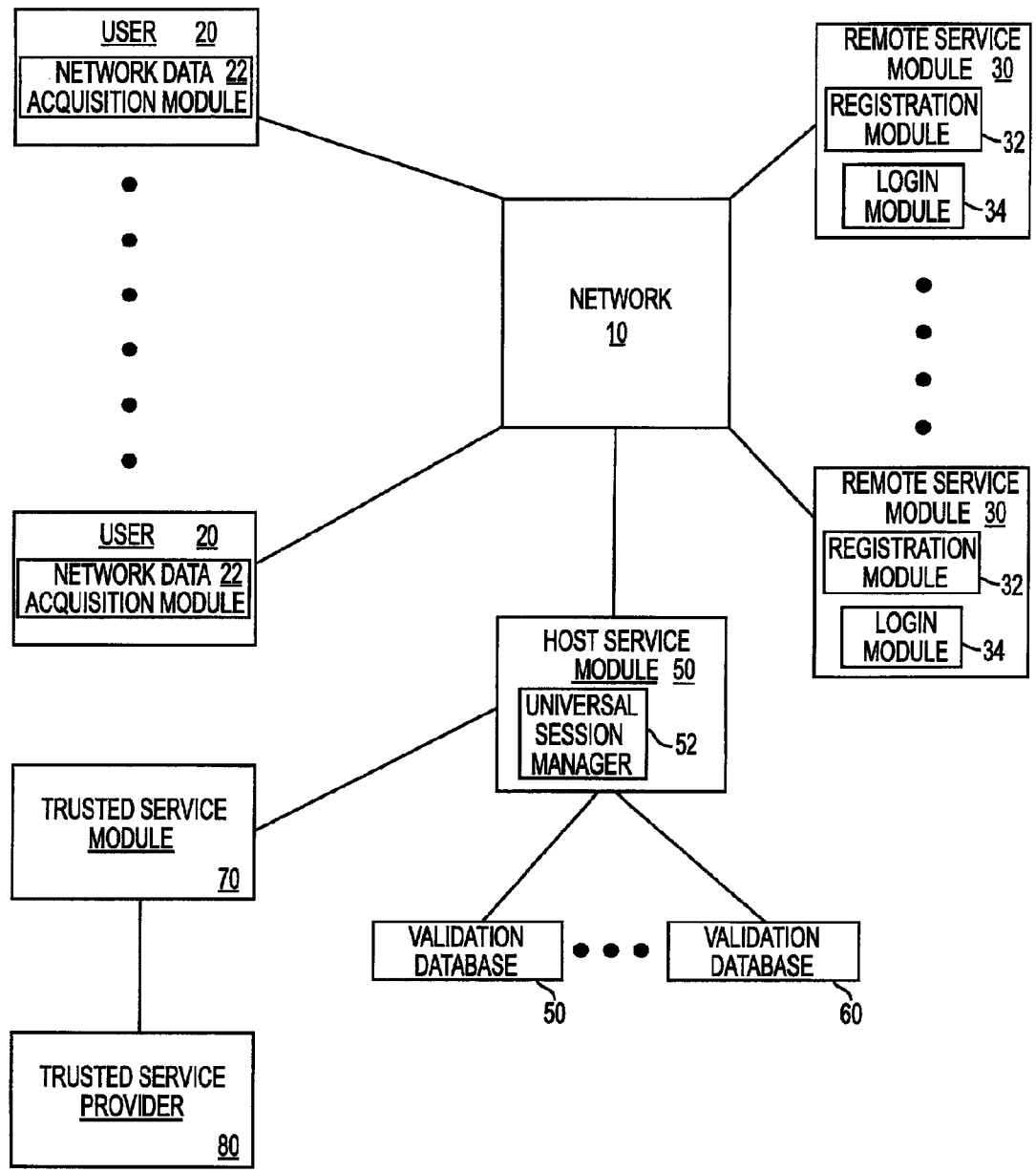
FIG. 1 depicts a schematic diagram of a system, according to an embodiment of the present invention.

For purposes of illustration, a system and method according to a preferred embodiment of the present invention are described herein. The system is described as being part of an Internet based system that enables customers of an Internet banking system to access remote Internet banking services, which may require a unique username and password, having only entered a single username and password required by the host Internet banking system. Furthermore, the invention is described in terms of an Internet based bank providing a multitude of financial services, some of which are provided by remote providers. However, it should be appreciated that this embodiment is exemplary only and that the invention finds application in any scenario involving a host site that includes links to distinct remote sites with their own separate login procedures. It should also be appreciated that the present invention could be implemented through a variety of networks such as a telephone network, a satellite connection network, or other network.

Also, for illustration purposes only, the invention is described in terms of the existing Internet. The skilled artisan will recognize that the invention could be implemented in variations thereto, such as the so-called Internet Protocol Next Generation (IPng) or any other variations of networked packet-switched technology.

According to one illustrative embodiment of the method of the present invention, a customer may first enter a username and password to gain access to the host server of an Internet bank. During the connection to the host server, a validation module validates the customer's username and password. If the combination is valid, the validation module transmits data to a universal session manager indicating which services the customer is enrolled in and the unique username and password that have been generated for each remote service in which the customer is enrolled. The customer is then free to select one of these remote services provided by a remote server through a link provided by the host service provider. For example, if a customer chooses to complete a loan application and this service is provided by a remote server requiring its own user ID and password, the universal session manager may then pass the required user ID and password to the remote server's login module.

The remote server may receive the data required for login, from the universal session manager and transmit to the universal session manager the status of the login attempt. If the login is successful, the customer may utilize the remote service with his/her web browser system without having to enter a username or password particular to the remote service.

In another illustrative embodiment, the present invention may provide customers of a banking system with access to remote service providers which require their own unique user IDs and passwords and have other special access requirements. For example, a customer may utilize a browser system to connect to a network bank providing a range of banking services with special access requirements. These secure services may include brokerage services. If after entering a valid username and password to the host service provider the customer chooses to utilize a remote brokerage service provider with special access requirements, a trusted server may act as an intermediary between the universal session manager of the host server and the remote brokerage system, for example. The trusted server may answer the login request of the banking site's universal session manager with a session ID extracted from a cookie placed on the user's browser by the trusted server. When the universal session manager receives the session ID, the customer may be redirected to the remote brokerage site.

Referring to FIG. 1, an exemplary embodiment of the present invention system is illustrative. A plurality of users or customers 20 may be connected using a network 10 to a host service module or provider 50. For example the host service provider 50 may be an Internet banking service site. Network 10 also may comprise a cable network, a LAN, a WAN, an intranet, an extranet, the Supernet, or any other electronic network that allows transmission of information.

Host service provider 50 may include a plurality of modules that function to perform the functions described above in addition to other functions set forth below. Although separate modules are described for performing these functions, it should be understood that additional modules may also be provided and that modules may be combined.

According to an embodiment of the invention, host service provider 50 may comprise a universal session module or manager 52 and a validation database 60. The universal session manager 52 may communicate with one or more databases 60 in communication with the host service provider 50. The database(s) 60 may store information required for login to remote sites or registration for the services those sites provide. Remote service provider 30 may comprise a registration module 32 and a login module 34. Registration module 32 may receive data from the universal session manager 52 necessary for customer 20 registration with the remote service provider 30. Login module 34 may communicate with the universal session manager to receive the information required for access to the remote service provider, e.g., username and password. Login module 34 may also reply to the universal session manager 52 indicating the status of the login request.

The system may also include a trusted service module 70 and a trusted service provider 80. The trusted service module 70 acts as an intermediary between the universal session manager 52 and the trusted service provider 80. The trusted service provider 80 may be a remote service with special access requirements in addition to a unique username and password.

Figure 2A:
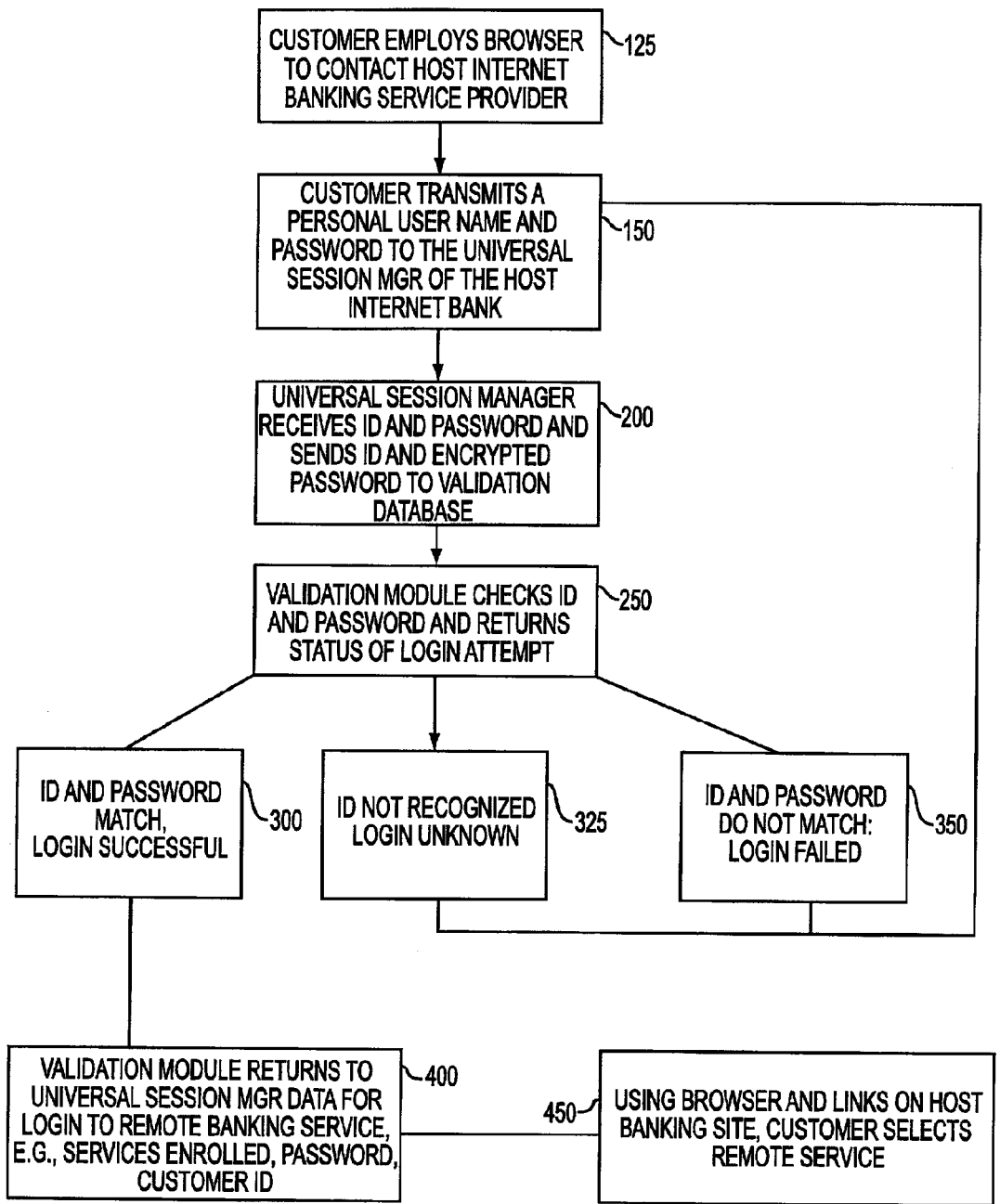
FIGS. 2A and 2B depict a flow diagram illustrating a method, according to an embodiment of the present invention.
Figure 2B:
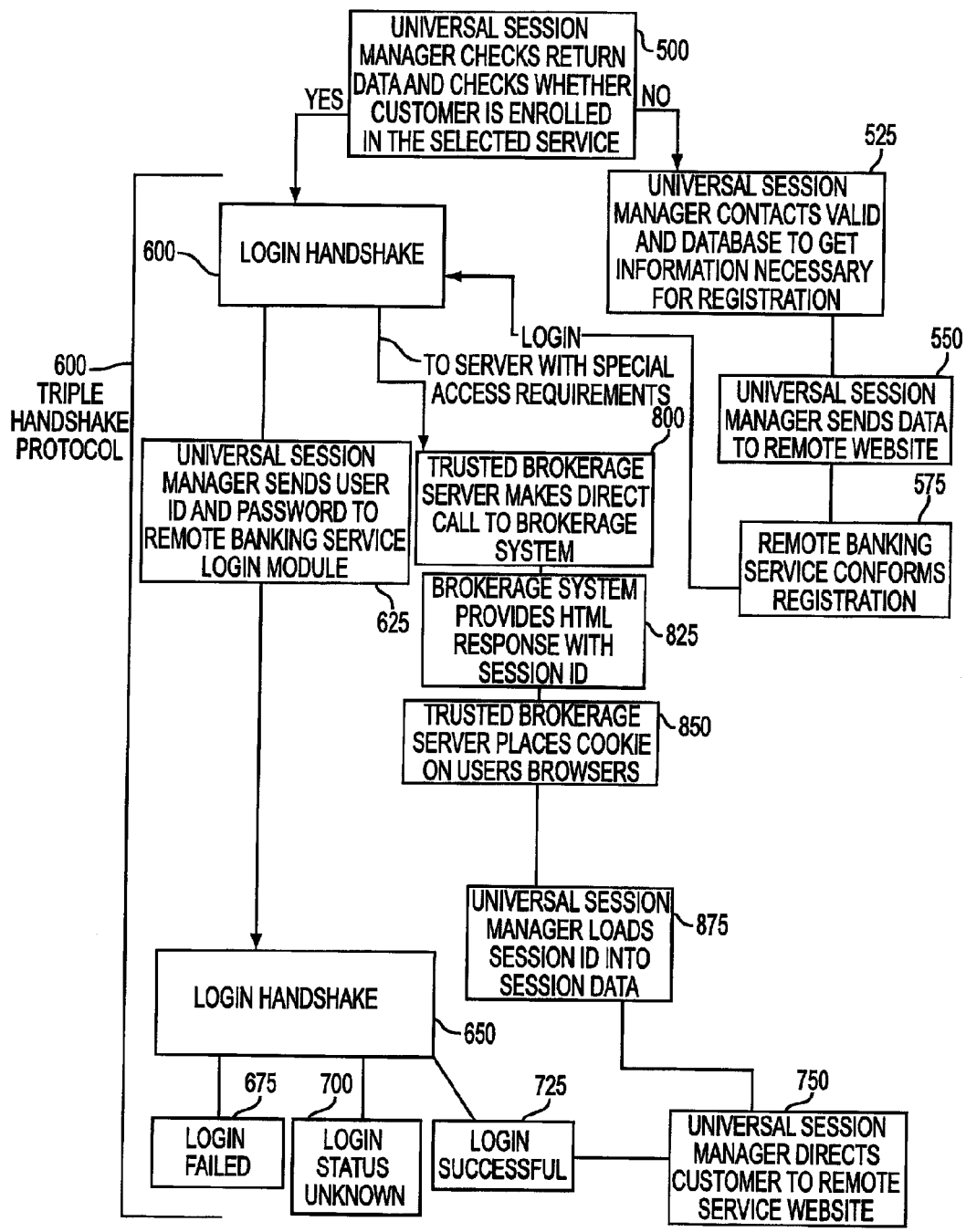

Referring now to FIGS. 2A and 2B, a method for providing customers with seamless entry to a remote server is illustrative. According to the method, a customer 20 employing a browser 22 may contact a host server such as an Internet banking service provider 50, according to block 125. A customer then transmits a personal username and password to a universal session manager 52 of the host service provider 50, according to block 150. The host service provider 50 may comprise a server system connected over a wide area network such as the World Wide Web or Internet 10 to provide web-pages upon request from one or more users utilizing a web browser 22. For example, a customer may use a browser 22 to connect over the Internet 10 to a web-site that provides Internet banking services. Existing browser/server technology may be used to transmit the username and password to the host service provider 50.

In response to the customer's transmitting a username and password to the universal session manager 52, the universal session manager 52 of the host service provider 50 may transmit the username and an encrypted version of the password to the validation database 60, according to block 200. The validation database 60 checks the username and password to make sure that the user has entered a valid username/password combination. If the username is not recognized by the validation database 60, according to block 325, or if the username and password do not match, according to block 350, the user will be asked to re-enter his or her username and password, according to block 150. The customer 20 of the Internet banking system 50 of FIG. 1 may be allowed, for example, three or another number of attempts to enter a correct username ID/password combination. Once the customer 20 has entered a valid login, according to block 300, the database 60 will return to the universal session manager 52 the information necessary for the transparent login to the remote service 30, according to block 400. As described, the information may comprise the type of the Internet banking services in which the customer 20 is enrolled and/or the username particular to that user and required by a remote banking service web site. The information may also in one embodiment include identifying information necessary for secured e-mail. The information also may include data necessary for profiling a dynamic application form related to user-selected products and services. The customer may select a link to one of the remote services 30 provided through the host service provider 50, according to block 450. For an Internet based banking system, these services may include, for example, checking account maintenance, credit card and loan applications services, electronic bill paying, and brokerage services. These services also may include Internet search engines, other web sites that offer membership services, e-mail services, or campaign advertising.

The universal session manager 52 may then check the validation database 60 return data to see if the customer has enrolled in the service, according to block 500. If the customer is enrolled in the selected service, the present embodiment initiates a triple handshake protocol, according to block 600. In the first step 625 of the triple handshake protocol 600, the universal session manager 52 may send the required customer username and password to the login module 34 of the remote service provider. This may comprise the universal session manager 52 of an Internet banking service provider 50 sending redirects to remote service web sites 30, which may include services such as on-line checking, on-line brokerage, on-line credit card application or online bill paying sites.

In the second step 650 of the triple handshake protocol 600, the login module 34 of the remote service module 30 sends the universal session manager 52 a reply indicating the status of the login request. The status may indicate that the login attempt to the remote service provider 30 was successful according to block 725, or that the login attempt failed according to block 675, or that the login status is unknown, i.e., customer has never registered for the service before, according to block 700. For example the login module 34 may send redirects over the Internet 10 to the universal session manager 52 of the host Internet banking provider's web site 50.

In the final step 750 of the triple handshake protocol 600, the universal session manager 52 may direct the customer to a remote service provider 30. For example, the universal session manager 52 of an Internet banking web site 50 may redirect a customer to the web site of the selected remote service provider 30.

If the universal session manager 52 determines that the customer is not registered for the selected service the universal session manager 52 will transparently register the customer for that service, according to the no branch of block 500. Transparent registration may involve that the universal session manager 52 contact the validation database 60 to retrieve the information necessary for registration, according to block 525. This may include providing a unique username and password designated for use only with the selected service. Then the universal session manager 52 sends data to the registration module 32 of the remote service provider's web site, according to block 550. The remote service 30 then confirms the customer's registration, according to block 575 and the universal session manager 52 initiates the triple handshake protocol 600. In the present embodiment, transparent registration may be accomplished by a series of redirects between the universal session manager 52, the validation database 60, and the registration module 32 of the remote service provider 30.

The customer also may choose an Internet banking service, e.g., a brokerage service, that has special access requirements in addition to a unique username and password. If the customer is enrolled in the selected service, the system may initiate a trusted server dedicated line redirection.

For example, the trusted service module 70 can make a direct call to the trusted service provider 80, according to block 800. This may comprise a trusted brokerage server 70 established by an Internet banking service 50 providing a secure brokerage service 80 which the login redirects over a dedicated line. The trusted service provider 80 may respond to the trusted service module 70 in the form of an html response with a session ID associated with it, according to block 825. For example, this may involve a brokerage system 80 responding to a trusted brokerage server 70 in html form over a dedicated line. The trusted service module 70 may send this "cookie" to the user's network data acquisition module 22, after reading the session "cookie" and extracting session ID. For example, this may include a trusted brokerage server 70 placing this "cookie" on the customer's Internet browser 22.

The trusted service module 70 next answers the universal session manager 52 with the status of the login attempt and the sessionID extracted from the cookie. Once the universal session manager 52 receives this data, if the login attempt was successful, the customer will be directed to the trusted service provider 80, as in step 750. This may comprise, the universal session manager 52 of an Internet banking service provider 30 receiving data from a trusted brokerage server 70 and then redirecting the Internet banking customer 20 to a brokerage service provider 80.

During a session, if a customer 20 remains logged in, but no activity occurs, the universal session manager 52 performs a data security function by causing customer 20 to automatically logout. In a preferred embodiment, this timeout occurs after about thirty minutes of inactivity.

FIGS. 3A and 3B illustrate an exemplary graphical user interface. FIG. 3A illustrates a screen that may be provided when a user 20 initially attempts to access host server 50. The user 20 is prompted to enter a user name and password, or alternatively to create a new user name and password to be granted seamless access to pertinent applications.

If the user 20 elects to create a new user name and password, access is granted upon the user's submission of data requested in FIG. 3B.

According to a preferred embodiment of the present invention an Internet Banking System is provided for offering many financial products or services to customers via a single sign-on process. The Internet Banking System comprises a host server that includes a Universal Session Manager (USM) for maintaining the customer single sign-on process. The USM is operatively linked to a validation database or module comprising a plurality of user profile databases. The USM authenticates a customer's login information and subsequently transparently logs the user into the various other services a customer has signed up for. Optionally, the USM may navigate a customer to various marketing, demonstration or application locations through the site of the Internet Banking host server. Preferably, authentication, customer-registration, customization of branded graphics, and ad generation are accomplished via one or more different modules operatively linked to the USM, however, it should be understood that these functions can also be accomplished via the USM. Separating these functions from the USM improves the overall functionality of the USM stream-lines the USM, and creates a series of financial services that are readily accessible to a customer via the USM.

The Internet banking system may offer many financial products and services, some of which may be offered by remote service providers. Preferably the system may offer a consolidated homepage that provides an overview of all the available services that can be accessed via a single sign-on. The consolidated homepage may give a customer a read-only summary of information on all active accounts with the Internet banking service as well as value-add features like stock portfolio, personal reminders, and targeted news feeds. Also, preferably, the home page may be customizable by the customer to show only those accounts, information and views the customer wishes to have displayed upon successful login. For example, the homepage may include one or more of the following features:

Bank account summary data presented on a secure homepage with applicable links;
Account summaries for all Internet banking products on a single page;
Customized stock portfolio tracking through an investment services module;
Financial news feed;
At your request offers;
Personalization of the consolidated page to allow customers to choose what account summaries they want data displayed;
Targeted promotions and advertising based on profiles of the customer;
Targeted financial news feed based on customer's preferences;
Reminder Service display of currently scheduled reminders; and
Automated clearinghouse (ACH), which is an electronic network for permitting clearance of paper checks and transmitting information regularly between a bank and the Federal Reserve.

To accommodate the requirements for the consolidated homepage, various services may be utilized, such as a dynamic page generator, a customer profile, an ad generator, or any other useful services.

The system may also allow card-members to see their credit card statements on the web site, and to have access to a bill pay functionality. Customers may also apply for credit cards or other financial transaction cards on-line. Customers having active card accounts may view their card statement on the web site. For example a customer may use a username and password for logging to the host service provider web site and access their active credit card accounts.

Customers may also apply for other services offered by the host service provider or other remote service provider. Therefore, using a single login customers may access a variety of services that would otherwise require multiple logins. The system will maintain the login information such as a username and password at one place and automatically update the login information whenever a customer changes this information for example by changing his or her password.

Preferably, the system may include a USM for controlling access to all Internet services linked to the host server. The USM may employ one or more conventional procedures for authenticating the identity of a customer by employing one or more well known techniques, such as username/password rules, encryption technology, enrollment processes, question/answer techniques, etc. The USM may include at least one storage device or module or database for storing and maintaining primary login and authentication information. Primary key mapping may occur depending upon the selected service, but does not necessarily exist universally. Customers may be notified, for example, via banner ads, emails, etc. about the consolidated login feature. Also, the login data may be duplicated in the profile database periodically to ensure continuity.

The primary function of the USM is to authenticate users, via a remote procedure call (RPC) to the validation module, and then transparently log them into the various services based on the remote services data sent back to the USM from the validation module via this RPC. The location of the USM may vary. For example, the USM may be part of the host server or it may be operated independently.

The on-line banking functions presented according to the invention may have a consistent look and feel to provide a consistent interface for a more customer friendly experience. For example, in one embodiment the top navigation bar may be reduced to the following tabs, Accounts, Products & Services, and Planning. When selecting the Products & Services tab, the customer will be presented with a page listing the banking products and services they are entitled to have, but don't currently have. When a customer selects the Accounts tab, the customer will be directed to a page listing customer accounts. The planning tab may allow a user to plan a banking strategy.

The system may dynamically generate the site based on customer data, customer preferences, and where the customer is coming from, i.e., what link brought them to the On-line Internet Bank. The types of variable aspects of the site generation may include, what services to show, for example, what pages to prepare, and which brand to show. For example, in order to dynamically show the services, to do targeted marketing, and to do private labeling, etc. the system may include a dynamic site assembler that can build the site/pages dynamically based on predefined business rules, and a customer data and preferences.

The invention may include the capability to personalize the web site based on customer information and preferences. This may include dynamically determining what offers to target to customers depending on their personal data, e.g., profile, preferences, customer activity, and customer account data. It may also include dynamically determining what products to cross-sell to customers depending on their personal data.

Customers may also be given an option to bookmark pages inside of the on-line bank, instead of always taking them to the homepage. For example, this functionality may include displaying actual URL's in the browser's top URL display window and sending customers that haven't logged in to a different non-public homepage, instead of a public homepage non-customers view.

The system may also provide a frequently asked questions page with links to information sources. The system may also include a pricing service offering different price points.

Figure 4:
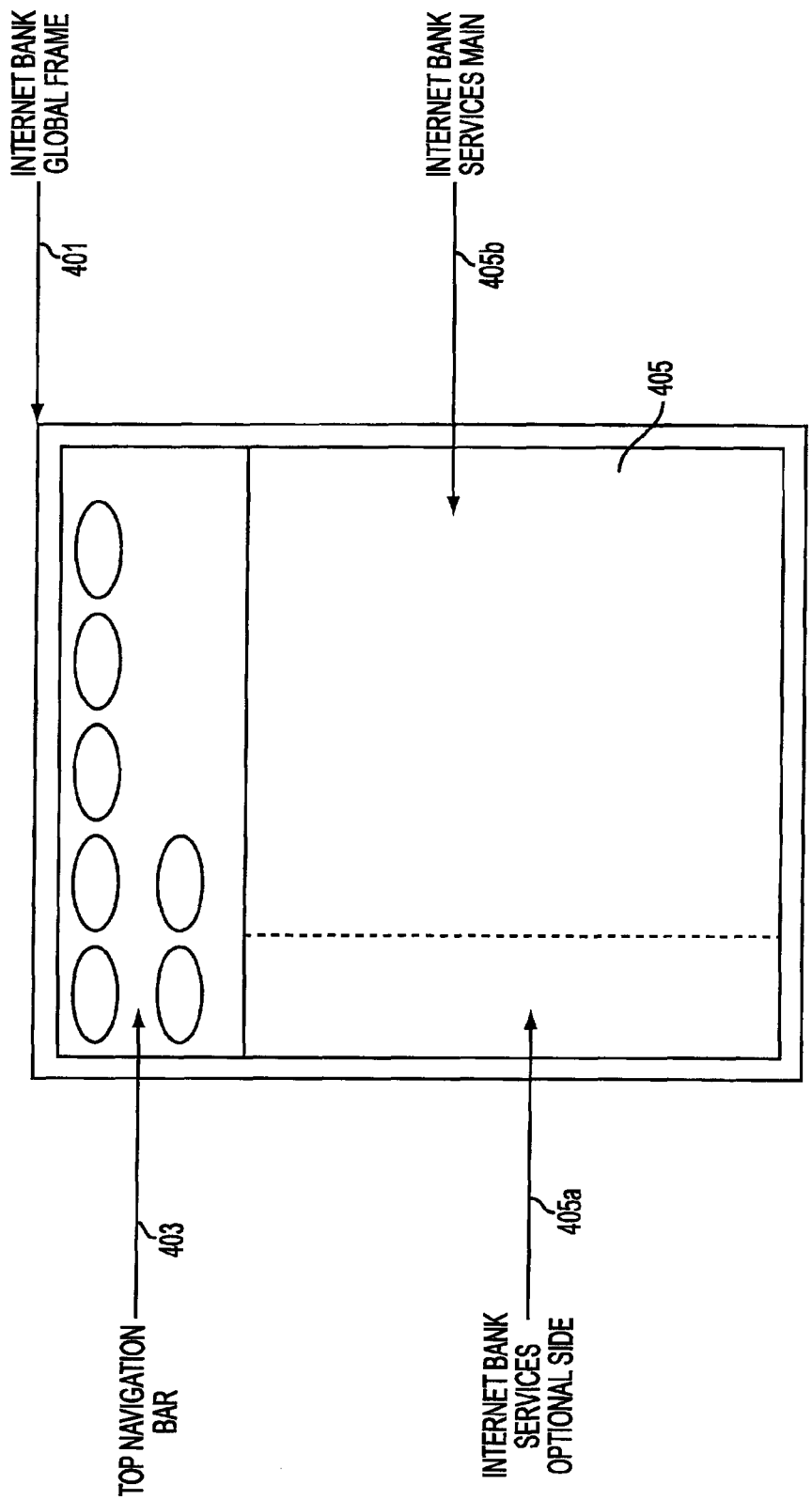
FIG. 4 shows one embodiment of a web site, according to an embodiment of the present invention.

According to one embodiment, shown in FIG. 4, the Internet Banking system may comprises a web site including at least three frames, a global outer frame 401, a top frame or Top Navigation Bar 403 which contains links to the various internal services as well as Login/Logout buttons and a bottom frame 405, where the remote (external) services will be hosted. Inside the bottom frame, there can be up to two frames, one left-hand service specific navigation bar 405a and a main frame 405b hosting the page. The USM will maintain the global outer frame and the top navigation bar, transparently logging and directing the customers to the selected service whether via tab selections or browser resize/refreshing. Also there may be left-hand navigation bars added (not shown).

The USM may typically update the last accessed times (LAT) and perform session timeouts based on this time variable. Activity in the top navigation bar and/or direct links to the dispatch servlet updating the LAT variables, thus preventing the customer sessions from timing out and being automatically logged out. If a customer is active within the bottom frame for more than a predetermined amount of time, such as 30 minutes (and does not activate the USM), their session may be closed and they will be logged out.

EXAMPLES

Example 1

Customer Login Specification

According to one embodiment of the present invention the host server may retrieve customer information data from a file in the validation module containing a plurality of customer login information and data. This file will contain authentication status and, if the status equals 0 for SUCCESS, it will contain the data necessary for the transparent logins to the various remote services in name-value pair format.

For example, the specification may include:
Customer login RPC input parameters:
CIFAUTH.USERID1=userid
CIFAUTH.PASSWORD=encrypted password
The validation module RPC will begin authentication of the customer. Possible return statuses include:
STATUS=0 successful authentication (additional customer info will also be provided)
STATUS=1 customer not found
STATUS=2 authentication failure
STATUS=3 authentication failure, exceeded max tries
Any status other than 0 (success) will return only the name STATUS and its value.
A success will return the following in a single, pipe-delimited, name-value pair string:
STATUS=0
CIF.ACN=customer number
CIFAUTH.USERID1=userid
CIFAUTH.PASSWORD=password
CIFAUTH.LSTLOGDT=last successful login date
CIFAUTH.LSTLOGTM=last successful logon time
CIF.TAXID=taxid
CIF.FNAME=first name
CIF.LNAME=last name
CIF.EMAIL=email
repeated section for each service a customer has enrolled in:
CIFSERV.SRVCAT=service category (BROKER, PAYMENTS, CREDIT, LOANS, DEPOSITS, ECOMMERCE)
CIFSERV.SERVICE=service name (for category PAYMENTS, TRAVELERS)
CIFSERV.STATUS=numeric status field, complies to following business logic if more than one account. If at least one account has a CIFACCT.STATUS of 1 or 7, then set CIFSERV.STATUS to 1, else if at least one of the accounts has a CIFACCTS.STATUS of 3, 4, or 8, then set CIFSERV.STATUS to 2, else set CIFSERV.STATUS to 0.
0—account open, but customer is not enrolled
1—active account
2—pended account
CIFSERV.PASSWORD=password associated with this service Each data pair will be delimited with a symbol such as a "|". This architecture supports an unlimited number of services a customer may be linked to. If a customer has multiple accounts with a given service, the CIFSERV.STATUS will indicate the customer's status with a service, not a single accounts' status. Thus, if a customer has at least one account with an active status, the CIFSERV.STATUS will be set to 1, else if they have at least one account with a pending status, the CIFSERV.STATUS will be set to 2, otherwise it will be set to 0. Essentially, the combination of two fields, SRVCAT and SERVICE, will repeat N times, depending on what services the customer has accounts with. Data needed for login for remote services can come from the non-recurring as well as the recurring sections. But it has to be data that is returned by the customer login procedure call.

Example 2

Selecting a Service Tab/Link (Navigation)

According to a preferred embodiment, when a customer selects one of the service buttons or tabs on the top navigation bar (FIG. 4), the USM may first check to see:
(a) if the customer has been authenticated to the host server.
(b) then it will check the validation module customer login RPC return data to see if the customer has enrolled in this service and depending on the CIFSERV.STATUS value the USM will provide different behaviors for the customer as described below.

If (a) is false or if the CIFSERV.STATUS value is equal to 0 (not active), the USM will direct the customer to the services' demo/marketing/apply pages. Otherwise if the CIFSERV.STATUS value is equal to 2 (pending), the USM will redirect the customer to a generic message screen with the message, "Your application is being processed. You will be notified when your account is activated." Else if the CIFSERV.STATUS value is equal to 1 (active), the USM will check the customer's session activity table to see if they already logged into this service during their current Intenet Banking session. If they have, they will be redirected to the remote services "main" page, otherwise they will be redirected to the remote Services "login" handshake.

In this embodiment there may be two mechanisms in place to handle the triple handshake protocol. The first is a series of browser redirects, and the second uses a Trusted Server with a dedicated line connecting Internet Banking system to the remote service. Those services requiring a dedicated line will use the Trusted Server to handle the transparent login of a customer to that remote service. Using the Trusted Server, once the transparent connection is completed successfully, a cookie may be placed on the person's browser identifying the customer to that remote service and they are redirected to the "main" page over the Internet.

The login parameters at the various remote services may vary. Some may require userid/password, some may require more parameters, less parameters, or different parameters. The USM preferably may be designed to accommodate any variety of login parameter required, as long as the parameters are stored at the validation module and are returned to the USM from the validation module during the customer login RPC. The USM has the login properties identified in the usm.properties file. When new remote services are added or login requirements change, the new service needs to be specified in this file and the list of login parameters specified. This file may contain a listing of the validation module variable names and a mapping of the validation module names to the variable names used by the USM.

Example 3

"Single" or First Leg of the "Triple" Handshake Specification

The USM may utilize dispatch and listen servlets to send redirects to the remote services. Redirection may include a "single" a "triple handshake" or a "tripleD" handshake. The "tripleD" is identical to the "triple" handshake, except that prior to sending the browser redirects, the data will be encrypted with a DES algorithm. For example, the first leg of the "triple handshake" may have the following format:

```
https://<service_url>.com/login?<login_param_name1>=
<login_id>&<login_param_name2>=<login_pwd>&returnURL=
www.Internetbank.com/listen?action=login&USMid=
<USMsessionId>&service=<service_name>
```

An example of this is:

```
https://banking.Internetbank.com/Scripts/bankstart.exe?userid=
12345678&password=abcd4567897qre&returnURL-
www.Internetbank.com/listen?action=login&USMid=
99999&service=BANKING
```

The USM may have a configuration file/table containing service names and name specification of login values.

Each name-value pair may be unique in order to differentiate them. The designated names for the login values in the usm.properties file may be:

CIF.ACN=customer userid
CIFAUTH.USERID1=userid
CIFAUTH.PASSWORD=password
CIF.TAXID=taxid
CIF.FNAME=fname
CIF.LNAME=lname
CIF.EMAIL=email
CIFSERV.SRVCAT=service
CIFSERV.PASSWORD=service_password The "single" handshake is used for services that all customers have access to, without login, enrollment, or registration requirements. An example of a "single" handshake site within the Internetbank is the public home page.

```
http(s)://<serviceURL>?<param1name>=
<param1value>&•••&<paramNname>=<paramNvalue>
http://home.Internetbank.com/Internet/users/users_home.htm
```

Example 4

Return Status of "Login" Handshake (Second Leg of the "Tripe" Handshake)

Once the remote services receive the login redirect, they reply with a redirect to the host server, indicating the status of the login request. The possible return values are:
OK—login successful
FAILED—login did not match
UNKNOWN—username not enrolled
OTHER—service is having system problems If the status is equal to FAILED, this indicates that the password data in the service provider's database has been changed (for a variety of reasons). This event needs to be logged for security monitoring purposes. Then the USM will perform the registration process.

If the status is equal to UNKNOWN, this indicates the customer has never registered a userid/password for this service. Then the USM will also perform the registration process.

If the status is OTHER, then for some reason either the login was not processed properly by the remote system, or there were some remote system problem/errors. The customer will be directed to try again at a later time. This event will be logged for monitoring.

If the status is OK, then the User Session Manager needs to save the service's local customer's session ID. The USM handles the remote login process for the various services in a transparent manner to the customer. The USM keeps track of the various services the customers have entered during the session. It will store the remote local session IDS for each of the services a customer has successfully logged into. Thus, if someone has successfully logged into a remote service during their customer session, the next time they select a link/tab to enter this service site, the USM knows they have been authenticated and will pass them directly to the "main" page of this site. This will limit the overhead of the "triple handshake" to once per customer session. If a remote service does not create session, then they can use whatever value they want to uniquely identify the customer. Preferably, the identifier value may not contain ampersands "&" and may not expose customer confidential data, such as social security number.

For example, the exception login may use the following format:

Hostname:xx, AppnName:xx, EventMsg:"EventClass:xxx, RemoteApp:xxx, UserID:xx, Source_ipaddr:xxx, SessionMgrID:xx, RemoteSessID:xx", EventDescription:"error message"

For those services that do not include a registration process, examples of values that may be returned, from the login handshake, are "OK" or "OTHER".

Example 5

Second Leg of the "Triple" Handshake Specification

Services using the "triple handshake" may relay login status values back to the USM. For example, the first leg of the "triple handshake", as described above may include a return URL parameter. Also, the remote services may append a session ID and a status to the end of this string and may have a complete signature for the second leg of the handshake.

For example, the resulting return redirect may look like:

```
https://www.Internetbank.com/listen?action=login&USMid=
<USMsessionId>&service_name>&session=<local session
id>&status<OK, FAILED, UNKNOWN or OTHER>
```

The return redirect may also look like:

```
https://www.Internetbank.com/listen?action=login&Usmid=
999999&service=BANKING&sesion=ababcdekduiekd&status=OK
```

Example 6

Customer Navigation to Remote Service (Final Leg of the "Triple" Handshake)

After the return status has been evaluated and is successful, the remote session ID has been stored in the customers' USM session, the customer may be redirected either to the registration process, a system problem message, or the production site. The customer navigation is preferably specified by the third leg of the "Triple" handshake.

After a successful remote login, the USM may redirect the customer to the service's main page. The Internet bank system may have control of the outer frame and the top navigational bar. The various services' pages may be hosted in the main bottom panel and may contain a left-hand navigation bar for local navigation. For example, a format for the redirect to the main page may be:

```
https://www.<service_name>.com/<name of main
page>?<param1name>=<param1value&•••&<paramName<=
<paramNvalue>
```

Also, the last leg of the "triple handshake" may be:

```
https://banking.Internetbank.com/scripts/bankstart.exe?USMid=
999999&session=ababcdekduiekd&service=BANKING
```

In the case of a FAILED or UNKNOWN status, the USM may call the registration process to register (or re-register) the customer with the remote service. If the status is OTHER, then for some reason either the login was not processed properly by the remote system, or there were some remote system problem/errors. The customer may then be directed to try again at a later time. This event may be logged for monitoring.

Example 7

Customer Service Registration

There are at least two kinds of data necessary for registering a customer with a remote service. The first is the unique userid and remote service password, the second is the data stored in the validation database necessary for registering a customer with a remote services databases.

The USM may use the CIF.ACN value as a unique userid. A remote password is generated using a series of algorithms specified by a data security server. Each remote service has a guarantee of not getting the same remote password as the other services for this customer because each service is specified a unique key that is used in the remote password generation process. These remote userids and passwords are unknown to the customers.

The exact data necessary to register a customer into the various services may vary depending upon the service. When a transparent service login fails with an UNKNOWN or FAILED status, then the registration process needs to contact the validation module Sanchez database to retrieve the information necessary for registration. This may be a two step process. For example, first the USM may contact the validation module with the CIF.ACN and the service name. The return values from this call are a list of column names of the data that has been flagged as necessary for registration. Then a second call may be made with the CIF.ACN value and the list of column names to retrieve the values necessary for registration.

A successful registration status may enable the User Session Manager to update the validation module with the remote password information. An unsuccessful registration status may cause the User Session Manager to give the customer a "try again" message. If a remote service does not require registration they may never return the UNKNOWN or FAILED statuses to the login call, but only the "OK" or "OTHER" statuses.

Example 8

Registration Handshake Specification

Registration Redirects

If the login leg of the "triple handshake" returns a status value of FAILED or UNKNOWN, the USM may send a registration redirect to that service transparently. This registration call may preferably be called only once per the life of the customer as a member of the Internet Bank, not once per session. For example, the registration redirect may have the following format:

```
https://<service_name's URL>/registration?customer_userid=
<CIF.ACN>&service_password=
<generatedremote_password>&•••&<registration_nameN>=
<nameN_value>&returnURL=www.Internetbank.com/listen?service=
<service_name>&action=registration&USMsid=<User
Session Manager session id>
```

The generated remote password value may be generated dynamically for that customer and that service using a series of algorithms and unique seeds/key associated with each service. Therefore, all remote services may depend on receiving a different customer userid and service password combination for that customer than the other services.

Other parameter values may also be retrieved from the validation database and dynamically added to the URL. Typically, the USM may have no ability to control what parameter values are retrieved from the validation database. For example, the validation database may have a column that flags the values it stores as necessary for customer registration. These may be the values that are retrieved from the validation module. The remote service may also send an acknowledgment reply. As the example shows, the reply may be the return URL parameter sent in the registration redirect with the addition of a local session ID and a status value.

--- www.Internetbank.com/listen?service=<service_name>&action=registration&USMsid=<User Session Manager session id>&status=<OK, FAILED, or OTHER>

---

If the reply contains the OK status value, then the remote password may be stored at the validation module and the USM may automatically start the "triple handshake" over again to transparently log the customer in. The event may be logged and the customer given a message indicating that there are problems accessing the remote site at this time. No data is updated the validation module.

Example 9

Logout Servlet

When a customer logouts or times out from the Internetbank host server, the USM may send a logout redirect to those remote services the customer has accessed during this session so that they may clean up their sessions. However, the remote service may choose to ignore this message. The USM may not receive a return from this redirect message. Thus this may be a message call without directing the customer's browser to the remote services site. An exemplary format of the logout redirect may be:
https://www.<service_name>.com/
   logout?session=<remote_sid>

Example 10

Dispatch Servlet

For certain services, such as email, the various remote services may contact the USM directly (not via tab or link selection by the customer), so that the customer may be redirected to that service. An exemplary syntax for this servlet may be:

--- https://www.Internetbank.com/sessionManager/dispatch?service=
   <service_name>&<param1name>=
   <param1value>&•••&<paramNname>=
   <paramNvalue>&fromService=<remote_service_name>
https://www.Interentbank.com/sessionManager/dispatch?service=
   email&acctNum=<customer's acctnumber>&fromService=
   <remote_service_name>

---

The dispatch servlet may follow the following business logic to determine customer navigation:
  a) Check to ensure the user has authenticated with Internetbank host server. If not, the USM may direct the user to a marketing/demo site for this service;
  b) If the customer has been validated, and the customers session table shows they have already been successfully logged into this remote service during the current session, the USM may direct them to the remote site's "main" page;
  c) If the customer has been validated and has not been logged into this remote service yet, and the CIF-SERV.STATUS value for this service is 0 or if the customer is not enrolled in this service, the USM may direct the user to the marketing/demo site;
  d) If the customer has been validated and has not been logged into this remote service yet, and is enrolled with a CIFSERV.STATUS value of 1 for this service, the USM may do the login redirect; and
  e) If the customer has been validated and has not been logged into this remote service yet, and has a CIF-SERV.STATUS value of 2, the USM may send them to a Generic Message site with a message, such as "Your application is being processed. You will be notified when your account is activated."

CheckLogin Servlet

If a remote service detects that a user entered their site directly, or if their own remote session timed out while the customer was active elsewhere on the Internet bank host server, they may want the transparent login to take place again to initiate a new local session. In this case, they can call a checkLogin servlet. The checkLogin servlet may:
  f) Check to ensure the user has authenticated with the host server. If not, the USM may direct the user to the marketing/demo site for this service;
  g) If the customer has been validated, and the CIF-SERV.STATUS value for this service is 0 or if the customer is not enrolled in this service, the USM may direct the user to the marketing/demo site;
  h) If the customer has been validated and is enrolled with a CIFSERV.STATUS value of 1 for this service, the USM may do the login redirect, even if they have already entered this site during their current session;
  i) If the customer has been validated and has an CIF-SERV.STATUS value of 2, the USM will send them to the Generic Message site with the message, "Your application is being processed. You will be notified when your account is activated."

Example 11

Change Password Servlet

The USM may include password functionality. On a change password screen, a customer may be allowed to select a new password (not a new username). Typically, they may provide a username, an old password, and a new password. The username and old password may be verified at a validation module to be correct. If this verification succeeds, the USM may check that the new password passes a set of rules to ensure the password is strong enough. If this succeeds, then the USM will update the primary password at validation module for this customer and return a successful changed password message. In case of any failures, the customers are notified the password was not successfully changed.

Customers with disabled accounts from for example 3 or more username/passwords failures, may not change their password until a predetermined time such as a 24 hour period has elapsed and their account is enabled.

Example 12

Vanity Servlet

The vanity servlet is a class used to execute vanity URLs. For instance, in the URL "www.Internetbank.com/login", "www.Internetbank."com" is the base URL and "login" is the vanity URL. The vanity URL can be created by using classes as explained below.

A "VanityReload" class is a startup class that can be initialized every time weblogic is started. The VanityReload class is responsible for reloading a vanity.properties file. The vanity.properties file is the file that is initially loaded during initial USM server startup. The vanity.properties file may be modified by adding and deleting URLs. It is stored in the server's memory and used by the vanity servlet for any vanity request. In order to add a new URL to the vanity.properties file, the procedure may be performed as explained below.

To add a new vanity URL "abc", i.e http://www.Internetbank.com/abc, an abc.uri property is required. For example, abc.uri=/sessionManager/dispatch?service=apply sends http://www.Internetbank.com/sessionManager/dispatch?service=apply to the vanity URL. Some of the optional properties that can be set using abc.urlBase can include overriding the default urlbase e.g. abc.urlBase=http://promo.Internetbank.com/abc.uri=abc.html will send to http://promo.Internetbank.com/abc.html instead of http://www.Internetbank.com/abc.html.

The 'abc'.parameters can specify what parameters should be appended to abc.uri. If this (abc.params) property is set, corresponding individual parameter's properties should be set. For example, the following properties:

abc.uri=abc.html
abc.params=cell,promo,click_id,brand
abc.cell=6WGD, abc.promo=VWG9DWG51,
abc.click_id=%j
abc.brand=WING would create and redirect to http://www.Internetbank.com/abc.html?cell=6WGD&promo=VWG9DWG51&click_id=%j&brand=WING An abc.expirydate property can be used to tell when the vanity URL expires. Format YYYYMMDD, for example, abc.expirydate=20000416. An abc.offerExpired.url is set to the URL where it is redirected to when vanity URL expires e.g abc.offerExpired.url=http://www.wingspanbank.com/sorry.html The default urlBase is which ever region the server is running under. If the server is running in QA port 80 the default urlBase will be http://wwwqa.Internetbank.com/.

Example 13

Customer Messaging

The USM may also provide a generic message screen where informative messages will be displayed for the customers depending on some error condition occurring. For example, messaging conditions may include:

Invalid Login attempt (*)
Disabled account (*)—exceeded 3 maximum failed login attempts Remote Service failure (*)—if login or registration fails due to "OTHER" reasoning (system, network, or dB failure)
Remote Service unknown (*)—if service name is not known to the USM and there is no valid redirects available
System failure (*)—if there are some system problems that arise.
Successful Change Password
Invalid Change Password attempt (*)—if the username and old password do not match what is in Sanchez
Disabled Change Password attempt (*)—if the username and old password had or becomes disabled during Change Password process
Unsuccessful Change Password attempt (*)—if there were some system problems, SQL update problems during the Change Password process
Pending Account Status—if the customer's CIF-SERV.STATUS value is equal to 2.

In the (*) conditions above, the events are logged in the format requested by the Data Security server. These logged events may be written to logs on an hourly or other basis and there are processes searching these logs to generate reports. This file needs to be augmented to trigger alerts automatically.

Example 14

Customer Branding/Top Navigation Bar

The User Session Manager may also have the capability to provide customized top navigation bars depending on how a customer enters the Internet banking service, whether they go directly to host server or whether they link to the Internet banking service from a partnered site, such as an Internet search engine.

Since the USM repaints the top navigation bar frequently during a customers' session, a mechanism is included to capture the brand, when a customer comes in front a partnered site, and retain it for the life of the customers host server session. For example, the USM may own the global outer frame, and all navigation may be directed through the USM.

Thus, when a customer navigates to the host server, the USM may check to see if there exists a valid customer session. If not, the USM may create a sessions, store the branding ID in the session and pass the rest of the query string parameters along to the designated service. All services may need to be notified that more data may be passed to them in the redirects and they may need to parse the data, or at least the branding ID along to all page redirects, within their systems as well as within the Internet bank system.

The USM may take some of its internal functions and make them into services, such as login. For example, the ad URL may be specified by a partner, when the customized top navigation bar is displayed. In one embodiment, customers of a search engine server can access the Internet Banking host server at least at three places.

An ad generator module may be employed to prevent display of competing ads in the top navigation bar to the partnered site or brand.

Example 15

USM OFX Interface

Preferably, an Internet banking customer, such as with an access account such as a Quicken account, or with the vanity servlet, or other mechanism may be able to download all of their account data from a single button click. One way to accomplish this may include configuring the access account or vanity.properties file to access the Internet banking OFX server with an Internet banking username and password. The Internet banking OFX server would then need to contact the USM to:

1. Perform the customer login to Internet bank service transparently;
2. The list of accounts retrieved from the validation module would have to have an indicator that flags it as one of the customer's accounts they want data automatically download;
3. The USM would then need to transparently log into the services that maintain the data for these accounts and retrieve the data (this could be by contacting an OFX server for each remote service);
4. The USM would then return this data to the Internet bank OFX server
5. The Internet bank OFX server may return the data to the OFX server and the data downloaded to the customer.

Example 16

Email

A separate server may be hosting the email services for the Internet banking system. For example, there may be links to email at various locations throughout the system so customers can email their questions or concerns. The required pieces of data for email are first name, last name, email address and optionally account number. If it is the Internet banking host server contacting the email service, the account number will be their Internet bank account number. For the remote services, such as brokerage, they may need to contact the USM so the customer can get redirected to the email service.

The USM may also retrieve additional data values from a response to the validation customerLogin query. If the customer has not logged in, there will be no values for first name, last name, or email. At this point, the bottom frame may be replaced with the email service. When the customer is done their email clicks submit, the email service may redirect them to the dispatch servlet to direct the customer back to the remote services' main page. Notice that the service name variable for the service=broker below may be the from Service value in the last part of the email redirects. The email service redirect may be: www.Internetbank.com/session-Manager/dispatch?service-broken.

Additional advantages features and modifications will readily occur to those skilled in the art. Therefore, the invention is not limited to the specific details in the representative embodiments shown and described above. Accordingly, various modifications may be made without departing from the spirit and scope of the general inventive concept as defined by the appended claims.

What is claimed is:

1. A banking system for offering a plurality of financial services to customers via a sign-on process, comprising:
  a host server;
  a universal session manager operatively disposed on the host server, the universal session manager maintaining the sign-on process;
  an interface to a plurality of remote servers by which a customer interfaces with the remote servers, the interface generated by the universal session manager, the interface having multiple frames; and
  a validation module operatively linked to the universal session manager through an electronic network, such that the universal session manager retrieves validation information from the validation database in order to validate a customer;
  the universal session manager, in conjunction with the validation module, enabling customers of the banking system to access the host server and the plurality of remote servers via a single login to the host server;
  the host server providing a consolidated homepage, via the interface, that gives a customer summary information on accounts of the customer with the banking system, and the host server further providing links to the accounts in a first frame of the interface, the accounts being respectively maintained by the plurality of remote servers; and
  upon selection of a link by a customer, the universal session manager:
    checks, based on information in the validation database, that the customer is allowed access to the remote server;
    provides access to a particular remote server, by hosting the remote server in a second frame of the interface, so as to allow the customer use of services on the remote server; and
    simultaneously presents the first frame, containing the links to the accounts, while presenting the second frame; and
    the universal session manager monitoring access to the remote server to observe customer activity; and
  the universal session manager sending a communication to the remote server based on observing the customer activity.

2. The banking system of claim 1, wherein the customer activity is constituted by access to the remote server through the second frame.

3. The banking system of claim 2, the universal session manager updating a last accessed time (LAT) variable based on the access to the remote server through the second frame, the LAT variable controlling session timeouts.

4. The banking system of claim 3, the universal session manager sending the communication to the remote server upon customer timeout.

5. The banking system of claim 2, the universal session manager sending the communication to the remote server upon customer logout.

6. The banking system of claim 1, wherein the validation module further includes a database storing information required for registering a customer in the remote service.

7. The banking system of claim 1, further comprising a trusted service module that serves as an intermediary between the host server and a trusted service provider.

8. The banking system of claim 7, wherein the trusted service provider comprises a remote server with special access requirements.

9. The banking system of claim 1, wherein the remote server is a remote service provider that further comprises a registration module and a login module.

10. The banking system of claim 9, wherein the login module receives the data for gaining access to the services provided by the remote service provider.

11. The banking system of claim 9, wherein the registration module receives the data for registering a customer in the remote service provider.

12. A method for accessing a plurality of financial services offered by a banking system comprising a host server and a plurality of remote servers operatively linked across an electronic network, the method comprising:

receiving login information, for accessing the host server, from a customer;

the host server providing a consolidated homepage providing (1) an overview of available services that can be accessed a single login on to the banking system, and (2) links to the available services, the consolidated homepage including a first frame and a second frame;

retrieving data for accessing at least one remote server based at least in part on the received login information;

transmitting said data to the at least one remote server;

authenticating that access by the customer to the at least one remote server is allowed; and transparently connecting the customer to the remote server such that the customer is provided access to the remote server, by hosting the remote server in the second frame of the interface, so as to allow the customer use of services on the remote server, the method including simultaneously presenting the first frame, containing the links to the accounts, while presenting the second frame;

monitoring access to the remote server to observe a customer activity; and sending a communication to the remote server based on observing the customer activity.

13. The method of claim 12, the monitoring access to the remote server to observe a customer activity including:

updating, by a universal session manager associated with the host server, a last accessed time (LAT) variable based on access to the at least one remote server through the second frame, the LAT variable controlling session timeouts of the consolidated homepage.

14. The method of claim 13, the sending a communication to the remote server based on observing the customer activity including:

sending, by the universal session manager, a communication to the at least one remote server upon either customer logout or timeout, such constituted by a communication from the universal session manager to the at least one remote server without directing the customer to the at least one remote server.

15. The method of claim 13, the sending a communication to the remote server based on observing the customer activity including:

sending, by the universal session manager, a communication to the at least one remote server upon customer timeout, such constituted by a communication from the universal session manager to the at least one remote server without directing the customer to the at least one remote server.

16. The method of claim 12, wherein the consolidated homepage provides a customer with information on accounts of the customer with the banking system.

17. The method of claim 12, further comprising:

determining customer data and customer preferences; and dynamically generating a customized homepage based on said customer data and customer preferences.

18. The method of claim 12, further comprising dynamically determining what offers to target to customers.

19. The method of claim 12, the first frame is maintained by the host server, and the second frame is maintained by a remote server providing services; and wherein the transmitting said data to the at least one remote server includes the host server directly sending login information to the at least one remote server, the login information including a customer username and password.

20. The method of claim 12, further comprising the steps of:

authenticating the identity of a customer; and transparently login the customer to all the services for which the customer has signed up, wherein said consolidated homepage includes:

a tab for accessing banking products and services a customer may be entitled to have but does not currently have; and a planning tab for providing financial planning assistance; and the method further comprising:

determining customer data, and customer preferences; and dynamically generating a customized homepage based on said customer data and customer preferences; and the first frame is maintained by the host server, and the second frame is maintained by a remote server providing services.

* * * * *